Oct. 8, 1929.  H. C. BELLEVILLE  1,731,091
AIRCRAFT LANDING
Filed Aug. 5, 1926  3 Sheets-Sheet 3
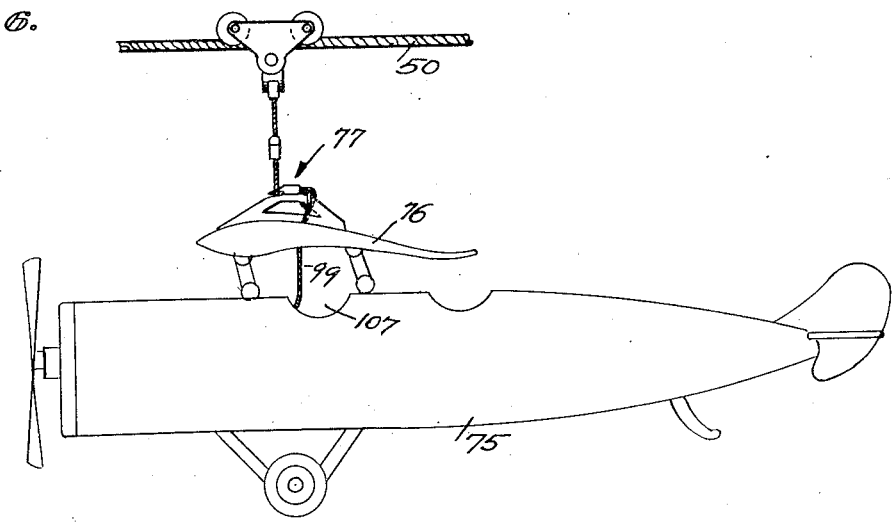
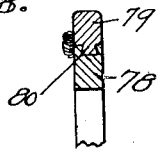
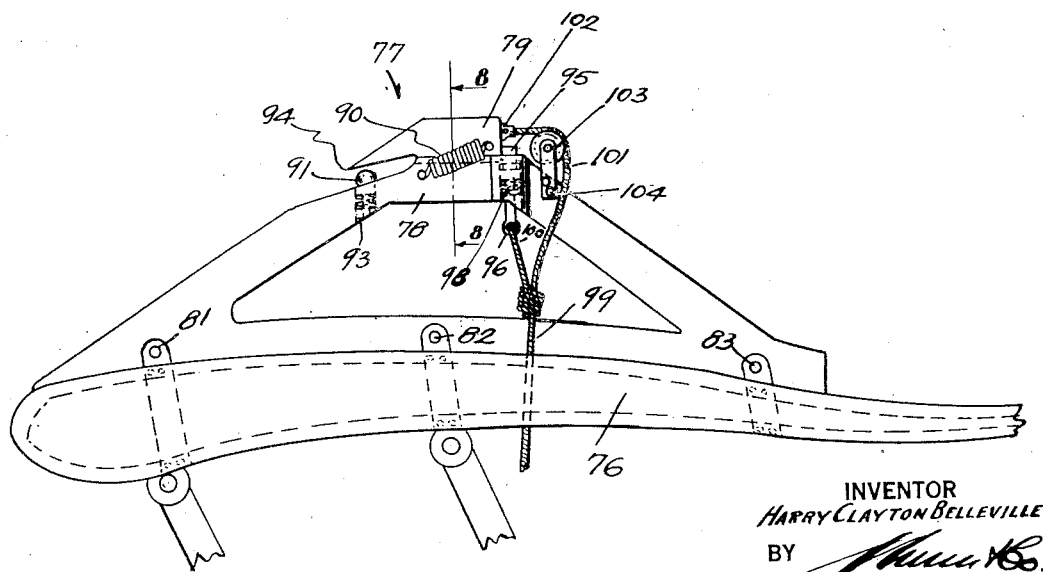
INVENTOR
HARRY CLAYTON BELLEVILLE
BY
ATTORNEYS.

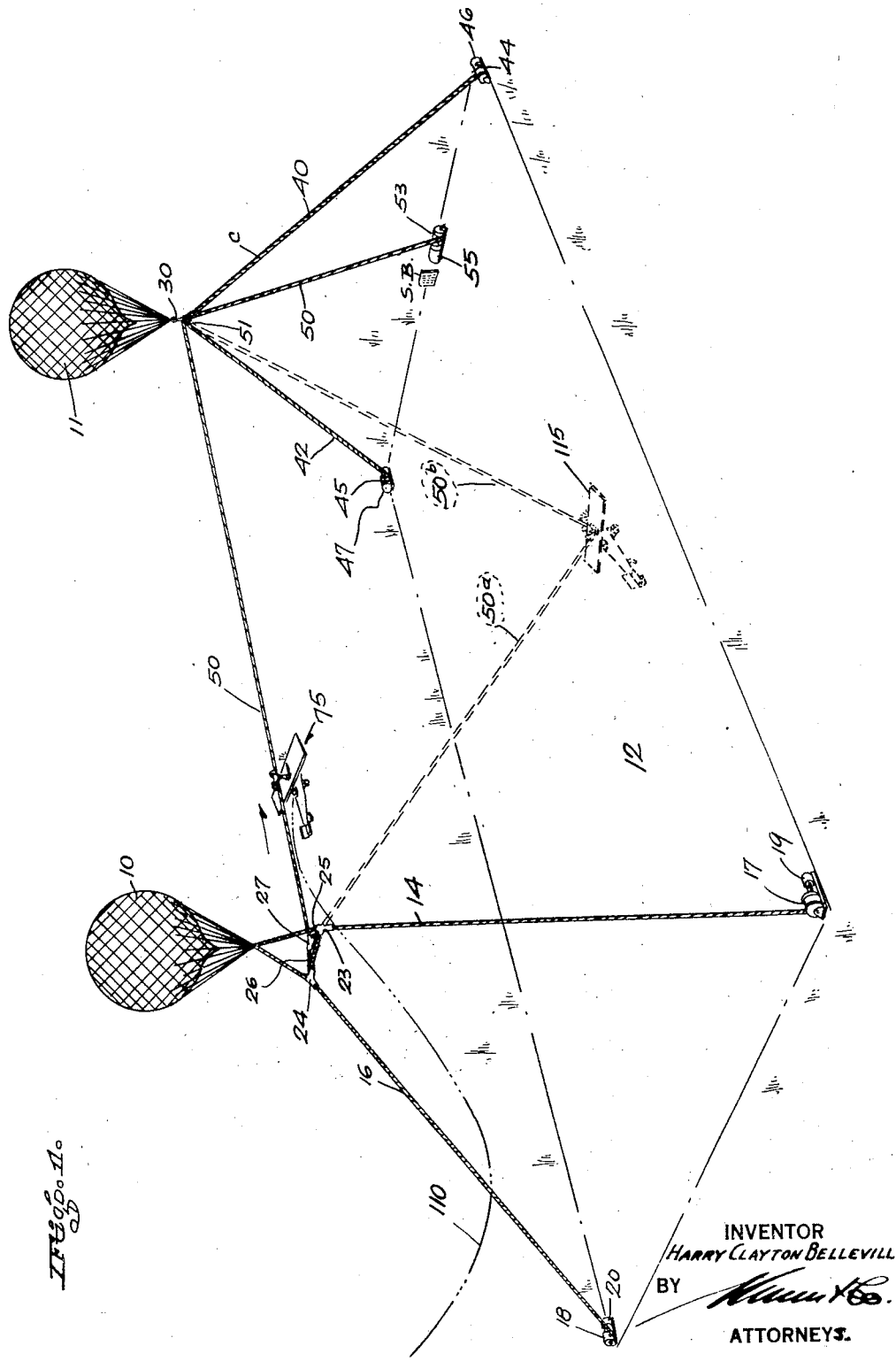

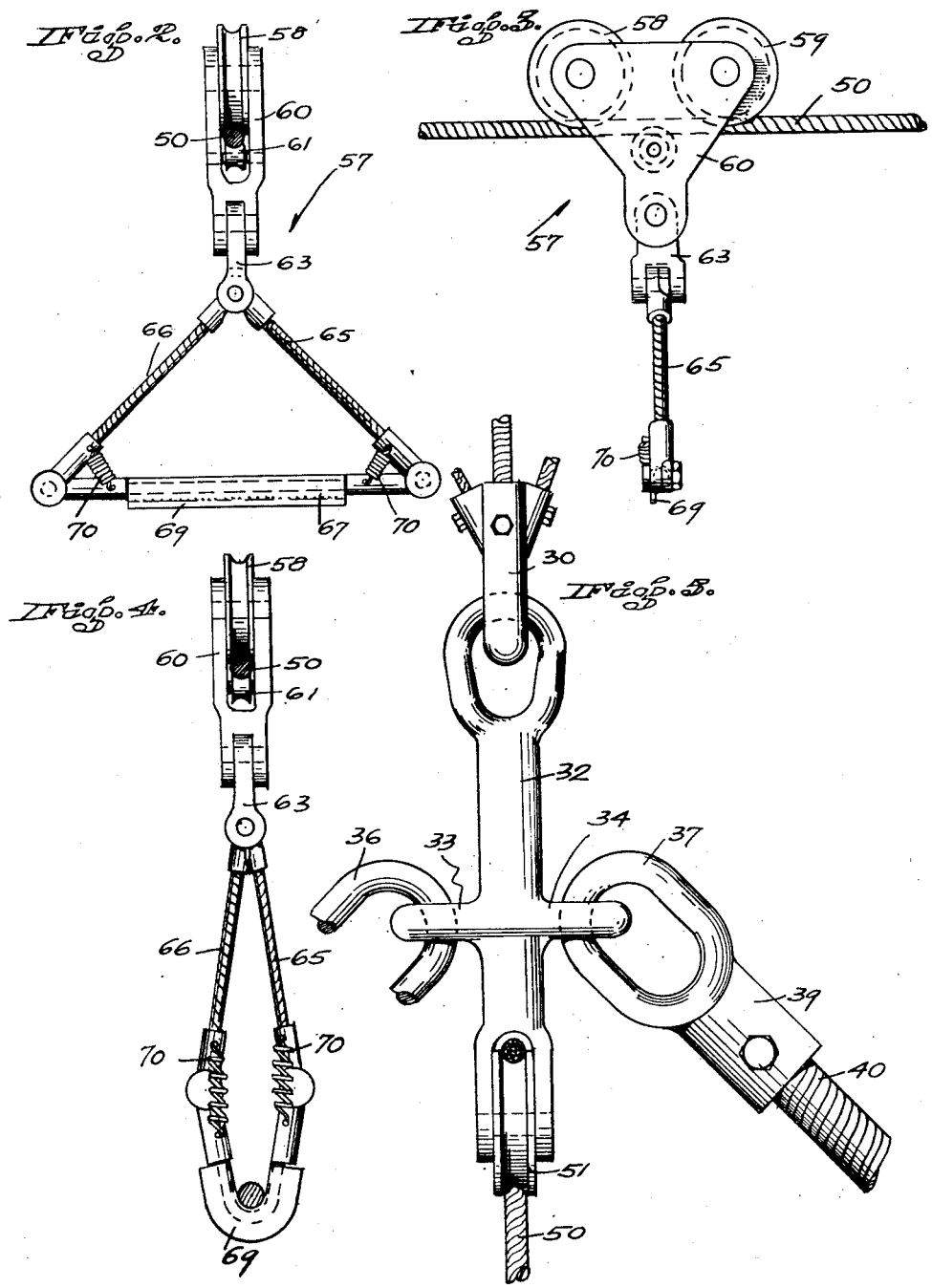

Patented Oct. 8, 1929

1,731,091

UNITED STATES PATENT OFFICE

HARRY CLAYTON BELLEVILLE, OF OAKLAND, CALIFORNIA

AIRCRAFT LANDING

Application filed August 5, 1926. Serial No. 127,423.

This invention relates to aircraft landings and it has as one of its objects the provision of a device of the character mentioned, whereby aircraft may be more safely landed.

More particularly, an object of my present invention is the provision of means for landing aeroplanes without subjecting the latter to damaging shocks, whereby fewer repairs of the planes will be necessary and the average length of life of the planes will be lengthened.

With the foregoing objects in view, together with such other objects and advantages as may subsequently appear, this invention resides in the construction and arrangement of parts hereinafter described and claimed, and illustrated in the accompanying drawings, in which Figure 1 is a perspective view of the apparatus of my invention and showing the same supporting an aeroplane.

Figure 2 is an end view of Figure 3, and

Figure 3 is a side view of Figure 2, these views showing a trolley or travelling means on an elevated cable, same being adapted to be engaged by a hook on an aeroplane.

Figure 4 shows the device of Figure 2 in collapsed position.

Figure 5 shows inter-locking links which are employed in the device of my invention.

Figure 6 is a side elevation of an aeroplane suspended from a cable.

Figure 7 is a side elevation in enlargment of parts of the apparatus shown in Figure 6.

Figure 8 is a vertical section taken on line 8—8 of Figure 7.

Referring to the drawings for more detailed description thereof, Figure 1 shows spaced balloons 10 and 11 captive above a landing field 12. The balloon 10 is secured at its lowest point to diverging cables 14 and 16, the lower end portions of which are wound respectively on rotatable drums 17 and 18. The drums 17 and 18 are respectively driven by electric motors 19 and 20. It will be noted that the upper ends of the divergent cables 14 and 16 are closer to the center of the field than are the lower ends; the purpose of this feature will be mentioned hereinafter.

A member 21 ties the cables 14 and 16 at points 23 and 24 and at these points are secured members 25 and 26 respectively. The members 25 and 26 are jointed at the point 27.

The lowest end of the balloon 11 is attached to a recessed member 30, as shown in Figure 5. The member 30 is linked with a depending member 32, the latter being provided with oppositely disposed links 33 and 34 with which are respectively linked the links 36 and 37 which are provided with recessed members 39 which receive cables 40 and 42 fixed thereto. The cables 40 and 42 are downwardly divergent and are inclined toward the cables 14 and 16 and their lower end portions are respectively wound on rotatable drums 44 and 45 adapted to be turned by electric motors 46 and 47 respectively.

Extending from the point 27 across to a position under the balloon 11, is an inclined cable 50, the lower end of which is at the point 27. The cable 50 passes over a pulley 51 which is mounted in the member 32, as shown in Figure 5. The cable 50, as shown in Figure 1, leads down to a rotatable drum 53 adapted to be turned by a motor 55. Adapted to ride on the cable 50 is a traveling device 57, shown in normal position by Figures 2 and 3 and in collapsed position in Figure 4. The travelling device or trolley 57 comprises a pair of wheels 58 and 59, tandemly disposed, having grooved peripheries engaging the cable 50. The grooved wheels 58 and 59 are rotatably mounted in a frame 60, which also carries a roller 61, disposed below the cable 50 and adapted to hold the cable in the grooves of the wheels 58 and 59. Pivotally secured in the lower end of the frame 60 is a link 63, to the lower end of which is pivotally secured two divergent members 65 and 66. The lower ends of the members 65 and 66 are pivotally secured to a horizontal member 67, the middle portion of which is covered by protecting material 69. The horizontal member 67 is tensionally held to the members 65 and 66 by coiled springs 70.

An aeroplane 75, which is adapted to be hooked on to the travelling member 57, while flying, comprises a body 76, carrying a hook 77 shown in detail in Figures 7 and 8. The hook 77 comprises a lower portion 78 and an upper portion 79 connected by a dovetail joint 80 as shown in Figure 8. It will be readily seen from Figure 7 that the lower part 78 of the hook 77 is secured to the member 76 at the points 81, 82, and 83, and that the member 76 is secured to the aeroplane as shown in Figure 6. The upper and lower parts 79 and 78 respectively of the hook 77 are slidable relative to each other. These parts of the hook are normally held in the position shown in Figure 7 by a coiled spring 90, the ends of which, as shown in Figure 7, are respectively connected to the upper and lower parts of the hook. Adjacent the mouth of the hook is shown a ball 91, retained in a recess formed in the lower part 78 of the hook and resiliently supported by a coiled spring 93 set vertically in the same recess as the ball 91. The ball 91, as Figure 7 shows, normally partly closes the mouth 94 of the hook. However, an object pressing inwardly at the mouth of the hook will be effective to depress the ball 91, and is thereby enabled to enter the mouth of the hook. However, after passing the depressed ball 91, the latter will spring upwardly, due to the coiled spring 93, and lock the object in the mouth of the hook.

It has been mentioned that the upper and lower parts 79 and 78 of the hook are slidable relative to each other. Normally, however, the upper hook is prevented from sliding on the fixed lower portion 78 of the hook, and thus stoppage is effected by the vertically slidable stop 95 which, as shown in Figure 7, extends from the eye 96, below the hook, to a point above the bottom of the top 79 of the hook. The coiled spring 98 normally keeps the stop 95 in the position shown in Figure 7. However, stop 95 may be pulled downwardly by means of a rope 99 and its branch 100, which passes through the eye 96 to the stop. When the upper end of the stop 95 is pulled below the bottom of the upper portion 79 of the hook, the mentioned upper portion may be retracted by means of a branch 101 of rope 99. This branch, it will be noted, is connected to the upper part of the hook at the position 102, and rides on a pulley 103 mounted on uprights secured to the lower portion of the hook, as shown at the point 104 in Figure 7. The branch 101 of the rope 99, as shown in Figure 7, is looser than the branch 100, so that the latter branch may withdraw the stop 95 from contact with the upper portion 79 of the hook, but the branch 101 becomes taut enough to retract the upper portion 79 of the hook. The rope 99, it will be noted, leads to the pilot seat 107 of the aeroplane.

In operation, the aeroplane 75, as shown in Figure 1, may, for example, take the course indicated by the dash and dot lines 110, shown in Figure 1. The hook 77 however, is always above this dot and dash line, and the pilot directs the aeroplane so that the cover 69 of the member 67, shown in Figure 2, is engaged by the hook 77, the former entering the mouth of the latter and becoming locked in the mouth by the ball 91. The aeroplane is thus securely suspended from the inclined cable 50 and, due to its momentum, will take along with it the travelling member 57. However, due to the inclination of the cable 50, the aeroplane with the engine shut down, will come to a stop before it reaches the right hand end of the cable. It will be understood of course that the cable 50 may be of any desired or sufficient length.

When it is desired to let the aeroplane down to the ground, it is only necessary to start the motor 55 to turn the drum 53 in such direction that the cable 50 is virtually lengthened so that the aeroplane will be lowered to the ground as shown at 115 in Figure 1, the cable 50 then assuming the position shown by the dotted lines $50^a$ and $50^b$, also shown in Figure 1.

It will thus be seen that the aeroplane may be hooked on to the cable 50 during its flight without shock, partly because of the collapsible construction or expansibility of the travelling means 57, as shown in Figure 4 in collapsed position, which it assumes when the aeroplane hooks on to the travelling means.

It will also be readily appreciated that in letting the aeroplane down to the ground by means of the cable 50, no damage will be done to the aeroplane. After the aeroplane has been landed on the field 12, the hook may readily be released from the cable 50 by pulling downwardly on the rope 99.

According to the action of the hook and associated apparatus, as previously explained, when the aeroplane is about to make a flight the cable 50 is made to engage the hook 77, and the cable 50 is lifted by means of the motor 55 from the dotted line position, shown in Figure 1, to the full line position shown in the same figure. The engine of the aeroplane is then started, and at the proper moment the rope 99 is pulled downwardly so that the upper part 79 of the hook is retracted, whereby the hook is released from the cable and the aeroplane is free for its flight.

When it is desired to adjust the cable 50 towards one side of the field, or to the other side, it is only necessary to operate the motors 19, 20, 45 and 46 in order to let out corresponding cables of the end pair of cables, and to pull in the other cables of the same pair.

It will also be appreciated that the inclination of the cable 50 may be varied by means of the motors just mentioned. By inclining cables 14, 16, 40 and 42 as described, a stable structure is secured, as will be readily appreciated.

While I have described one embodiment of my invention, modifications thereof may be readily devised without departing from the spirit of my invention, and it is to be understood that such modifications come within the scope of the appended claims.

I claim:—

1. An aircraft landing, comprising a plurality of lighter than air members, an aircraft supporting cable carried by said members, and means for slackening or tightening said cable.

2. An aircraft landing, comprising a plurality of balloons, means for holding said balloons a predetermined distance above the supporting surface, an aircraft carrying cable supported by said balloons and means for slackening said cable or tightening it.

3. An aircraft landing, comprising a plurality of balloons, cable winding means disposed on the ground, cables connecting said balloons to said means whereby an actuation of said winding means will permit the raising or lowering of said balloons, an aircraft carrying member supported by said balloons and means for feeding slack into said member for permitting said member to lower the aircraft on the ground or to raise it therefrom.

4. An aircraft landing, comprising a plurality of balloons, retaining cables connected to said balloons, and to cable winding devices, said devices being disposed away from each other for causing the cables to extend angularly from the balloons to the ground and prevent movement of the balloons, an aircraft supporting member carried by said balloons and means for feeding slack into said member or for making said member taut.

5. An aircraft landing, comprising a pair of balloons, angularly extending cables connected to said balloons, cable winding means disposed on the ground and being connected to said cables, one of said balloons holding cables having a horizontal portion long enough to permit an aircraft to fly thereunder and between the downwardly extending portions of the cable, and an aircraft supporting member secured to said balloons and being connected to said horizontal portion.

HARRY CLAYTON BELLEVILLE.